Figure 1:
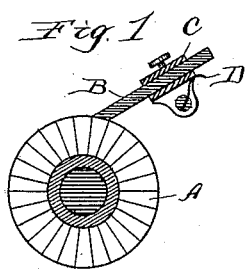

(No Model.)

H. P. BROWN.
ELECTRIC COLLECTING DEVICE OR BRUSH.

No. 440,691. Patented Nov. 18, 1890.

Witnesses:
Geo. C. Curtis
H. W. Munday.

Inventor:
Harold P. Brown
By Munday Evarts & Adcock
His Attorneys

UNITED STATES PATENT OFFICE.

HAROLD P. BROWN, OF NEW YORK, N. Y.

ELECTRIC COLLECTING DEVICE OR BRUSH.

SPECIFICATION forming part of Letters Patent No. 440,691, dated November 18, 1890.

Application filed June 6, 1890. Serial No. 354,504. (No model.)

*To all whom it may concern:*

Be it known that I, HAROLD P. BROWN, a citizen of the United States, residing in New York, in the county of New York and State of New York, have invented a new and useful Improvement in Electric Collecting Devices or Brushes, of which the following is a specification.

My invention relates to contact-makers or brushes used for establishing electrical connection with the commutator-rings of electric motors or dynamos or between parts which move one in respect to the other.

Heretofore commutator-brushes for electric motors or dynamos have usually been made either of metal—such as copper—or gas-retort carbon, such as is commonly employed for the carbons of arc lights; but great difficulties or objections have been experienced in the practical use of the metal or copper brush, owing to the arc frequently produced between the brush and commutator. The arc produced burns off the copper both from the surface of the commutator-ring and from the surface of the brush, and soon destroys both unless great care is observed in keeping the proper area and line of contact preserved. The copper being easily converted into gas by the temperature of the arc, produces destructive sparking when the load on the dynamo or motor is suddenly varied. Metal or copper brushes must necessarily have considerable resilience. This they lose by the high heat produced by the sparking, thus rendering the contact poorer and increasing the sparking and consequent destruction. The spring or resilience of the metal brush also causes it to vibrate and creates a great noise. The friction between the rapidly-revolving metal commutator and the metal brush is also great, produces heat, and renders necessary constant lubrication, and the metal dust that wears off, mixing with the oil or lubricant, gets on all parts of the dynamo or motor, and as such metal dust and oil is a conductor it frequently causes the burning out of the field magnets or armature by producing a conducting-contact between two parts of the dynamo or motor having different electrical potentials. While the carbon brush heretofore used may not be subject in the same degree to these difficulties, there are other objections or difficulties to its use. Carbon is such a poor conductor of electricity that it is found impracticable to use carbon brushes on dynamos or motors carrying heavy currents, because the requisite area or surface of contact cannot be had between the brush and commutator-segments. Such heavy-current dynamos or motors have therefore always heretofore employed metal or copper brushes, owing to the poor conductivity of the carbon brush. Its use necessarily results in a waste of electric energy and produces heat at the point of contact. The carbon also easily forms an arc. The carbon surface is rough, and its mere friction on the commutator is great at high speeds of the commutator and produces heat, rapidly wears away the commutator, and produces noise. The carbon brush is also a very poor conductor of heat, so that the heat produced by sparking and by friction is kept at the point of contact with the commutator, where it does the greatest damage, instead of being conducted to the brush and brush-holder, where it can be radiated away without injury.

The object of my invention has been to discover or produce a brush or contact-maker for making electrical connection with a relatively moving part—as, for example, the commutator-ring of an electric dynamo or motor—which will not be open to the objections or difficulties incident to the use of either the metal or carbon brush. It is well known that the sparking is increased by incandescent particles of carbon or copper or copper-gas melted or disintegrated from one electrode and carried to the other. In my invention I therefore make the brush or contact-maker of a substance that will withstand an extremely high heat without any material melting or disintegration of its particles, to the end that the formation of an arc between the commutator and brush may be prevented, as well as the heat, waste of energy, and destruction of brush or commutator incident thereto. To prevent friction, the consequent wear of the brush and commutator, heat and loss of energy, I make the brush of a substance which is in itself a lubricant. By this same means I also not only avoid the labor, care, and expense of oiling the commutator, but also the danger of burning out the field-magnets or armature by the oil and dust forming electrical connections between parts having different electrical potentials. Indeed, my brush cannot be well or practically used if the surface of the commutator were oiled, as has heretofore been the common practice, because the substance of which my brush is made would tend to dissolve if the commutator were oiled, and thus cover the commutator-ring with a coating or layer of conducting material, and thus interfere with the operation of the dynamo or motor, and this fact is perhaps one reason why my invention or discovery has not sooner been made by me or by others. In my invention I also make the brush of a substance which is a good electrical conductor, so that there may be no unnecessary loss of energy or heat produced by the poor conductivity of the brush, and so that the small amount of surface contact required may render its use practicable upon dynamos or motors carrying the heaviest currents. The substance of which I may make my brush is also a much better heat-conductor than carbon, so that the heat will not be confined at the point of contact, but may be conducted and radiated away through the body of the brush and brush-holder. Another characteristic of my brush is that, unlike carbon, it is not easily broken by mechanical jars, and unlike a copper or metal brush there is no tendency for the edge of my brush to catch on the commutator-segments when the direction of motion of the armature is reversed, which reversal is very necessary in motors used for street-car and many other purposes.

My invention consists in a brush or contact-maker composed of graphite and clay for establishing electrical connection with a relatively moving part—as, for example, a commutator-ring—as this I find unites and combines in itself all the above-mentioned characteristics and produces a simple, durable, and efficient device for the purpose.

My graphite and clay brush or contact-maker is itself a lubricant, and neither tends to wear nor heat the commutator by friction, and therefore needs no oiling. Its melting temperature is higher than gas-retort carbon or copper, and I find it to be extremely difficult to produce an arc between my graphite and clay brush and the commutator-ring, however great may be the current carried or to whatever variations the load of the dynamo or motor may be subjected. My graphite and clay brush is also a much better electrical conductor than the carbon brush, so that there is no unnecessary loss of energy or heat produced by its lack of conductivity. On account of its perfect self-lubrication my graphite and clay brush is almost completely noiseless, it is not easily broken by mechanical jars, it has no resiliency to lose by heat, and it permits the reversal of the motor or dynamo with perfect freedom and without any tendency for its edge to catch on the commutator-segments. My graphite and clay brush is also a fairly good conductor of heat, so that heat generated at the point of contact will be conducted by the brush itself to the holder and radiated away.

In practicing my invention the graphite is combined with a suitable binding substance to hold it in shape and place. Any suitable binding material may be used. Preferably, however, it is mixed with clay, as that is a refractory material not easily subject to change or disintegration by heat. The percentage of binding material or clay may be greatly varied. I prefer, however, to employ only a comparatively small percentage of clay, as the greater percentage employed diminishes the conductivity of the brush. The mixture of graphite and clay commonly used in the manufacture of graphite for lead-pencils is suitable.

My invention, while it is chiefly designed for use as a contact-maker or brush for making electrical connection with the relatively moving commutator ring of dynamos or electric motors, may also be used for making electrical connection between itself and other relatively moving parts or devices, and it is obviously immaterial whether the brush itself be the moving part or the commutator or other device the moving part.

Figure 3:
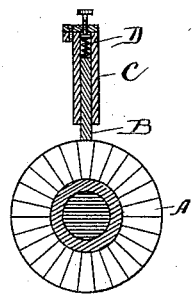
Figure 4:
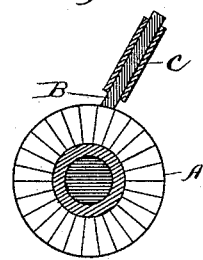
Figure 2:
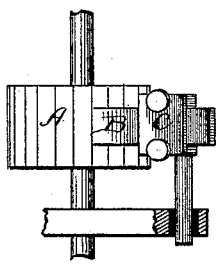
Figure 5:
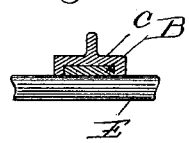

In the accompanying drawings, which form a part of this specification, and in which similar letters of reference indicate like parts, Figure 1 is a sectional view of a device embodying my invention. Fig. 2 is a plan view. Figs. 3 and 4 represent slight modifications. Fig. 5 shows its use as applied to a moving part other than a commutator.

In the drawings, A represents a commutator-ring of a dynamo or electric motor, the construction of which is well known, and it may be of any suitable form or construction known to those skilled in the art.

B represents my graphite brush or contact-maker, and C is the holder for the brush.

D is a spring by which either the brush or its holder is pressed against the commutator.

In Fig. 5, in the place of a commutator A, an electrical contact piece or part E is shown, which may be either a moving part in respect to a stationary brush B or a stationary part in respect to a moving brush; or the brush B and part E may both be moving devices.

The brush is preferably made in the form of a bar or plate composed of graphite and a suitable binding material, such as clay.

I claim—

The combination, with a commutator of an electric machine, of a brush or contact-maker composed of graphite and clay mixed together, substantially as specified.

HAROLD P. BROWN.

Witnesses:
A. M. BIRDSALL,
R. EMMET DOHERTY.